(12) United States Patent
Limpkin et al.

(10) Patent No.: US 7,967,627 B2
(45) Date of Patent: Jun. 28, 2011

(54) ROTATABLY LOCKING TWO PART INDUCTIVE CONNECTOR

(76) Inventors: George Limpkin, Thetford (GB); Simon Grant Rozenberg, Mentmore (GB)

( * ) Notice: Subject to any disclaimer, the term of this patent is extended or adjusted under 35 U.S.C. 154(b) by 0 days.

(21) Appl. No.: 12/600,864

(22) PCT Filed: Jan. 17, 2008

(86) PCT No.: PCT/GB2008/000165
§ 371 (c)(1),
(2), (4) Date: Nov. 19, 2009

(87) PCT Pub. No.: WO2008/087423
PCT Pub. Date: Jul. 24, 2008

(65) Prior Publication Data
US 2010/0136801 A1  Jun. 3, 2010

(30) Foreign Application Priority Data
Jan. 18, 2007  (GB) .................................. 0700976.4

(51) Int. Cl.
*H01R 13/62* (2006.01)
(52) U.S. Cl. ............................................ 439/314
(58) Field of Classification Search .................. 439/668, 439/675, 75, 314, 332–335, 578–585, 350; 361/328; 336/83
See application file for complete search history.

(56) References Cited

U.S. PATENT DOCUMENTS

| | | | | |
|---|---|---|---|---|
| 4,038,625 A * | 7/1977 | Tompkins et al. | ............... | 336/83 |
| 6,416,334 B1 * | 7/2002 | Plishner | .......................... | 439/75 |
| 6,764,397 B1 * | 7/2004 | Robb | ............................... | 463/23 |
| 6,808,407 B1 * | 10/2004 | Cannon | ......................... | 439/314 |
| 6,994,579 B2 * | 2/2006 | Yokoigawa et al. | .......... | 439/320 |
| 7,395,166 B2 * | 7/2008 | Plishner | ......................... | 702/108 |
| 7,422,486 B2 * | 9/2008 | Hoff et al. | ..................... | 439/660 |
| 2004/0033711 A1 * | 2/2004 | Loveless et al. | ............. | 439/314 |
| 2005/0239311 A1 * | 10/2005 | Yokoigawa et al. | .......... | 439/311 |

FOREIGN PATENT DOCUMENTS

| | | |
|---|---|---|
| EP | 0473336 A | 3/1992 |
| JP | 2000 260642 A | 9/2000 |
| WO | 2004/097866 A | 11/2004 |
| WO | 2004/102748 A | 11/2004 |
| WO | 2005/109581 A | 11/2005 |

* cited by examiner

*Primary Examiner* — Chandrika Prasad
(74) *Attorney, Agent, or Firm* — David A. Guerra (57) ABSTRACT

A two-part inductive connector comprises a primary part having a primary half core and a secondary part having a secondary half core, the primary part including first locking means which are engageable with second locking means on the secondary part, one of the primary or secondary parts further comprising a pin which is receivable in a recess formed in the other of the primary or secondary parts, the connector having an unlocked position in which the primary and secondary half cores are not aligned and in which the first and second locking means are not engaged, and a locked position in which the primary and secondary half cores are aligned and the first and second locking means engaged, the connector moving between the unlocked and locked positions by relative rotation of the primary and secondary parts about the pin.

30 Claims, 6 Drawing Sheets

ROTATABLY LOCKING TWO PART INDUCTIVE CONNECTOR

CROSS-REFERENCE TO RELATED APPLICATION

This application is an U.S. national phase application under 35 U.S.C. §371 based upon co-pending International Application No. PCT/GB2008/000165 filed on Jan. 17, 2008. Additionally, this U.S. national phase application claims the benefit of priority of co-pending International Application No. PCT/GB2008/000165 filed on Jan. 17, 2008 and Great Britain Application No. 0700976.4 filed on Jan. 18, 2007. The entire disclosures of the prior applications are incorporated herein by reference. The international application was published on Jul. 24, 2008 under Publication No. WO 2008/087423.

BACKGROUND OF THE INVENTION

1. Field of the Invention

The present invention relates to an electrical connector and particularly to an electrical connector for inductive connections.

2. Description of the Prior Art

Various types of electrical connectors are known in the art. The majority of electrical connectors transmit a current by way of direct metal-to-metal contacts. These connectors typically comprise a plug part and a socket part, the plug part being formed with pins which frictionally engage sockets formed in the socket part. The pins and sockets make the electric contact and also hold the two parts of the connector together.

Another type of electrical connector is the inductive connector. Inductive connectors typically comprise a primary part and a secondary part, each comprising a half core which has a coil wrapped round it. In use, the two parts are brought together so that the half cores are positioned adjacent each other. A current is passed through the winding on the primary half core which induces a current in the winding on the secondary half core. Various means of connecting the primary and secondary parts together are known, such as multiple protrusions received in sockets, clips or other resilient means for snapping into recesses and bayonet formations for locking into recesses, as described in WO 2004/097866.

GB 392052 discloses another form of connector for coupling a primary part and a secondary part of an inductive connection. The parts are formed in respective housings which each have circumferential lips. When the parts are brought together, the lip of one of the parts fits inside the lip of the other part such that the lips frictionally engage and therefore hold the two parts together.

These known connections have the problem that particulate material and contaminants can become lodged between the electrical connections or the primary and secondary half cores when the two parts of the connector are pushed together. This can cause damage to the electrical connections or half cores, which may reduce efficiency of the connection or even cause a safety hazard.

Additionally, locating the pins or resilient clips of one part of the connector in the sockets or recesses of the other part of the connector can be cumbersome and time consuming, since each of the pins or clips must be correctly aligned with the respective socket or recess. Further, it is sometimes found that assembling or disassembling parts having pins and recesses is physically difficult since the pins make a very tight fit in the recesses to ensure that the parts do not become accidentally disassembled.

The present invention aims to alleviate these problems.

SUMMARY OF THE INVENTION

According to the present invention a two part inductive connector comprises a primary part having a primary half core and a secondary part having a secondary half core, the primary part including first locking means which are engageable with second locking means on the secondary part, one of the primary or secondary parts further comprising a pin which is receivable in a recess formed in the other of the primary or secondary parts, the connector having an unlocked position in which the primary and secondary half cores are not aligned and in which the first and second locking means are not engaged, and a locked position in which the primary and secondary half cores are aligned and the first and second locking means are engaged, the connector moving between the unlocked and locked positions by relative rotation of the primary and secondary parts about the pin.

The present invention has the advantage of providing locating means in the form of a pin and recess as well as, and separately from, the locking means. The locating means enables the two parts of the connector to be brought together simply and quickly ready for relative rotation, thereby facilitating engagement of the locking means.

It is to be noted that, whilst the pin and recess perform a locating function, they can also be shaped and sized to frictionally engage with each other so as to contribute to retaining the two parts of the connector together.

The primary and secondary parts may each include a data carrier for transmitting data between the primary and secondary parts. This is particularly advantageous since the same connector can be used to transfer data as well as power, reducing the amount of cabling needed or increasing the data transfer capacity available in a situation. The data carriers may be incorporated in the pin and recess such that the data carriers are brought into alignment when the pin is located in the recess. Combining the data carrier and pin/recess in this way allows a simple construction of the connector.

Alternatively or in addition, each of the primary and secondary parts may be provided with one or more data carriers that are spaced apart from the pin and recess, such that the data carriers are brought into alignment when the locking means are engaged. In this way, more than one data connection is available, which allows a greater rate of transmission of data.

The data carrier(s) can be selected from a fibre optic, infra-red, laser, radio frequency, acoustic, piezo electric, capacitive or magneto resistive carrier.

The pin and/or recess may in addition, or alternatively comprise an earth connection for providing a continuous earth line through the connector. Providing earth continuity via the pin and recess of the connector is simple and convenient. However, an earth connection may alternatively be provided on the primary and secondary parts spaced apart from the pin and recess.

In one embodiment, at least one of the primary and secondary parts further includes one or more additional primary or secondary half cores respectively. Where only one of the primary and secondary parts includes more than one half core, the connector can include more than one of the other of the primary and secondary parts. Alternatively, both parts include more than one half core, in which case the respective primary and secondary half cores can be brought into alignment when the primary and secondary parts move into the locked position. Thus, more than one electrical connection can be made with a single connector, increasing the number of devices that can be powered or the total capacity of the connector. The additional half cores may be arranged in a variety of ways provided that relative rotation of the primary and secondary parts about the pin and recess brings each half core of the primary part into alignment with a respective half core of the secondary part. For example, the half cores may overlap each other or they may be arranged so that they lie generally along radial or circumferential lines with respect to the pin or recess.

The primary part may include a first contact face for contacting, in use, a second contact face on the secondary part. In this case, the pin preferably extends away from either the first or second contact face and the recess preferably has its opening in the other of the first or second contact face. The primary and secondary half cores are preferably arranged so that their ends are adjacent to, or form part of, the respective contact face.

In embodiments where the data carriers are spaced apart from the pin and recess, their ends are exposed at the first or second contact face and are flush with the contact face. This ensures that the contact face is generally planar, having the advantage that the face can be wiped clean easily and dirt and debris cannot become lodged in small recesses. This makes the connector suitable for use in dirty or wet environments. It also means that the contact faces can slide over each other during movement between the locked and unlocked positions, therefore automatically wiping the contact faces clean as discussed further below.

One or both of the primary and secondary parts may include a housing in which the primary or secondary half cores respectively can be partially or fully located. The pin may extend away from the relevant one of the first or second housing and may, optionally, be integrally formed with said housing. The recess may be formed in the other one of the first or second housing. The contact faces of the primary and secondary parts preferably form part of the housing. Including a housing ensures that the half cores, wires and other components can be protected from the surrounding environment.

Optionally, the primary and secondary parts can be configured so that the contact faces are not aligned with each other in the unlocked position and are aligned in the locked position. This causes a leading edge of each housing to slide over the contact face of the other part when, in use, the primary and secondary parts rotate relative to each other towards the locked position. This can be achieved by arranging the pin and/or recess non-centrally on the respective contact faces and/or by making at least one of the contact faces non-circular. Contact faces which are generally elongate i.e. are substantially longer in a first direction than in a second direction perpendicular to the first direction, such as elliptical, oval or rectangular shapes, are preferred. In this case, the pin or recess may be centrally located on the contact face.

With these arrangements, the primary and secondary parts are brought together by inserting the pin into the recess. The shape of the contact faces or the location of the pin and recess means that the contact surfaces of the two parts are not aligned initially. When the parts are twisted relative to each other about the pin to bring the contact faces into alignment, the leading edge of each part sweeps over the contact face of the other part. This ensures that any debris on the contact faces is brushed off the contact faces and does not become trapped between the contact faces, as can happen with some known connectors. This is particularly advantageous over the prior art since the connector is self-cleaning and therefore reduces the likelihood of damage to the connectors or the need for cleaning.

The primary and secondary half cores preferably have an electrical wire wound around them.

A switch may be provided on one or both of the primary or secondary parts to vary the relative number of windings of electrical wire on the primary and secondary half cores which are in use. The connector may therefore act as a transformer and so can receive or produce a range of voltages as required.

The primary and/or secondary parts may be coupled to one end of first or second cables respectively, each cable including electrical lines. The electrical lines can be electrically connected to the electrical wire wound around the half core for carrying a current to or from the electrical winding. The cable may be adapted at its other end to connect to a power (and optionally data) supply or to an electrical appliance.

Where provided, the data carrier and/or the earth line is preferably incorporated in the cable.

Optionally, one or both of the primary and secondary parts may be adapted to be integral in an electrical device, such as a laptop or other computer, PDA, camera or mobile phone, for example to couple the device(s) to a power supply or to couple a device to another electrical device. In this case, the electrical wire wound around the respective half core can be connected directly into the electrical device, no external connector cable being required.

In another embodiment, one or both of the primary and secondary parts includes a USB connector for connecting to an electrical device such as those mentioned above.

The half cores may be shaped to allow the connection leads, particularly the data carrier and/or the earth line, to pass through the connector. For example, the half cores may be formed with a recess or bore through which the data carrier and/or the earth line pass. This structure ensures that the data carrier and/or the earth line do not need to deviate greatly from a linear path which could otherwise affect transmission efficiency or mechanical durability.

Optionally, the first and second locking means are frictionally engaged in the locked position. This provides for a relatively reliable locking engagement which is easy to manufacture and use. In one embodiment the locking means can comprise a projection on one or both of the primary or secondary parts which frictionally engages a locking recess on the other or both of the primary or secondary parts. Alternatively, the locking means may include a part which resiliently clips or snaps into a locking recess. More than one projection/recess or clip/recess may be provided on each part.

In a preferred embodiment, the projection includes an axially extending arm carrying a lip protruding perpendicularly therefrom, the locking recess being sized and shaped to receive the lip, and optionally, the arm, such that the arm frictionally engages the locking recess, upon relative twisting of the primary and secondary parts.

Alternatively, or in addition, one of the first and second locking means may comprise a magnet, the other of the first and second locking means comprising a material which is attracted to the magnet. Preferably both the first and second locking means comprise a magnet. The use of one or more magnets in the invention is advantageous since the magnet can provide a strong attractive force while not suffering from mechanical fatigue. Also, since the connector is moved between its unlocked and locked positions by relative rotation of the primary and secondary parts, the magnetic attraction between the locking means is broken by shearing the locking means rather than merely by separating the magnets in a linear direction, which requires more force.

Each housing may be a two-part moulding and may include a hard part such as a polycarbonate part into which the half core is inserted and which forms the contact face, and a soft part such as a urethane rubber part which can receive the cable.

Optionally, the connector may include a sensor to detect when the first and second parts are in the locked position. The sensor may be of the magnetic, electrical, capacitive or infrared type.

The primary and secondary half cores may have any suitable cross-section, such as square, circular, triangular, oval, half-moon or rectangular.

According to a second aspect of the present invention, an inductive connector for coupling to a second inductive connector comprises an inductive half core, locking means for engaging with locking means on the second inductive connector and locating means selected from a pin or a recess to engage corresponding locating means on the second inductive connector and allow rotation of the inductive connector relative to the second inductive connector about the locating means to bring the locking means into engagement.

The connector of the second aspect of the invention can be the primary part or the secondary part of the two-part inductive connector described above. Accordingly, the connector can have any of the features of the primary and secondary parts described above.

BRIEF DESCRIPTION OF THE DRAWINGS

The present invention will now be described, by way of example only, with reference to the accompanying drawings, in which.

DESCRIPTION OF THE PREFERRED EMBODIMENT

Figure 1:
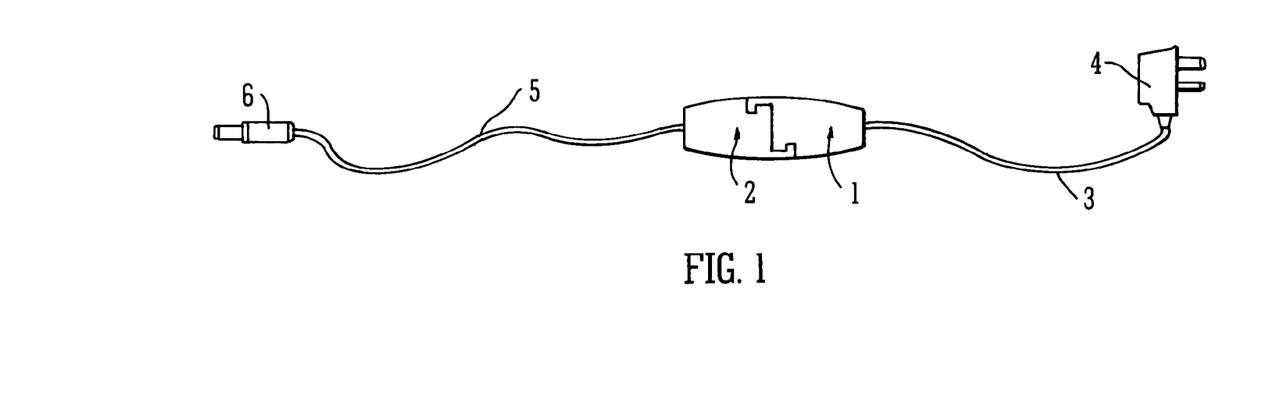
FIG. 1 is a schematic view of a two-part inductive connector according to the present invention in the locked position.

The two-part connector of the present invention is shown in use in FIG. 1. A primary part (1) is coupled to one end of a first cable (3), the other end of which is coupled to a plug for a high frequency power supply (4). The primary part is connected to a secondary part (2) which is coupled to one end of a second cable (5). The other end of the second cable is coupled to a jack plug (6) which can in turn be coupled to an appliance such as a laptop.

Figure 2:
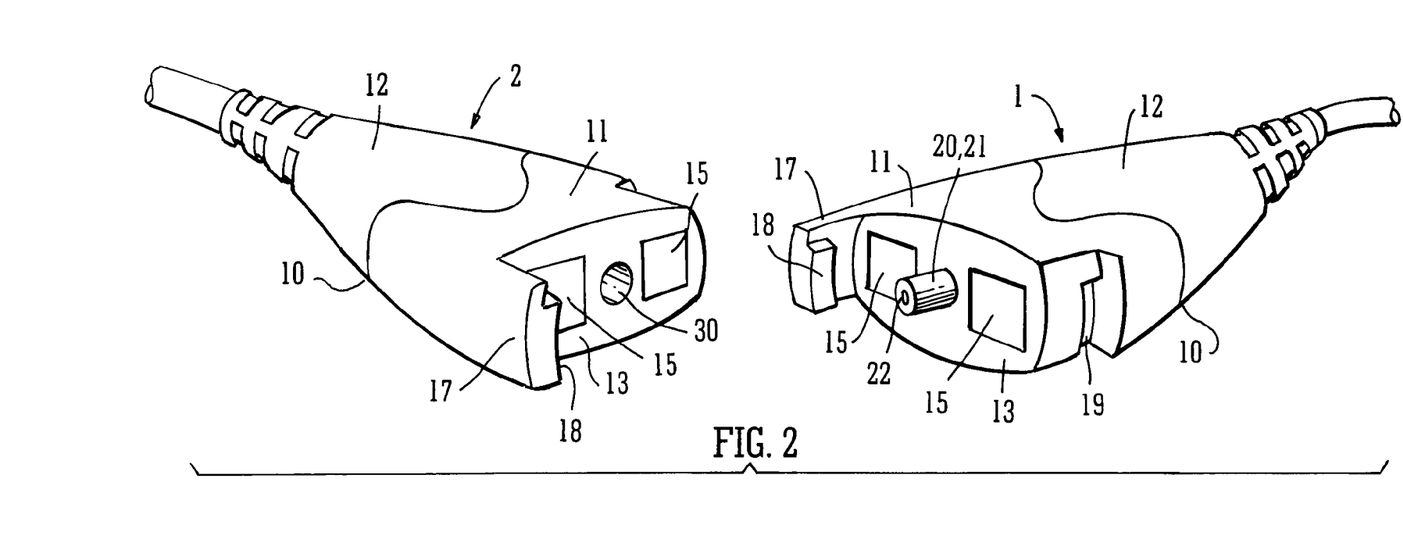
FIG. 2 is a perspective view of the primary and secondary parts.
Figure 3:
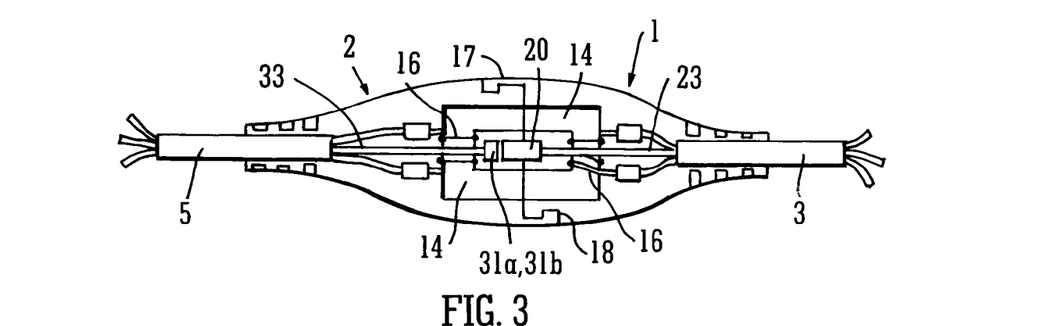
FIG. 3 is a cross-section of the connector of FIG. 1.

The primary and secondary parts can be seen in more detail in FIGS. 2 and 3. Each part (1,2) has a two-part moulded housing (10), the first part (11) being made of a hard plastic material such as polycarbonate and the second part (12) being made of soft urethane rubber. The first part (11) includes a generally planar contact face (13) which, in use, makes contact with a contact face of the other part of the connector. The shape of the contact face is generally elliptical.

A half core (14) made of a high resistivity material, such as ferrite having a resistivity of at least $10^4$ Ωcm, is located in each hard moulding (11). The half core (14) can have a variety of shapes known to the skilled reader, the nature of which is not the concern of this invention, providing the half core has two ends (15) for coupling to another half core. The two ends (15) of the half core are substantially planar and are exposed to and are flush with the contact face (13). An electrical wire (16) is wound around each half core.

The primary part (1) has a generally centrally located pin (20) extending away from the contact face (13). The secondary part (2) has a recess (30) located generally in the centre of the contact face, the recess being sized to receive the pin (20). In this embodiment, the pin comprises a brass sheath (21) around an end (22) of a fibre optic cable (23). The recess (30) has a brass ferrule (31a) or spring clip (31b) located therein to receive the brass sheath (21) of the pin (20). An end (32) of another fibre optic cable (33) is located in the brass ferrule (31a) or spring clip (31b).

Each housing (10) is formed with locking means including an arm (17) extending in an axial direction (i.e. along the axis of the pin) having a lip (18) projecting perpendicularly thereto, and a recess (19) which is shaped to receive the arm (17) and the lip (18) of the other part of the connector. The arms (17) and recesses (19) are such that, when the primary and secondary parts (1,2) are coupled together, as shown in FIGS. 1 and 3, the housings (10) form a smooth, continuous surface with no protrusions or cavities.

A cable (3,5) leads away from each housing (10). One end of each cable is received in the urethane rubber part (12) of one of the housings. The other end of each cable is coupled to either a plug to a high frequency power supply or a jack plug for connection to an electrical appliance. Alternatively, one of the cables could be wired directly to an appliance.

Each cable (3,5) contains a live wire and a neutral wire which are coupled to the ends of the wires (16) wound around one of the half cores (14). The cable also includes an earth wire which is connected to the brass sheath (21) of the first connector (1) or the brass ferrule (31a) or spring clip (31b) of the second connector (2). In addition, in this embodiment, the cable comprises the fibre optic (23, 33) for carrying data. The fibre optic (23, 33) extends through the housing (10), around the half core (14), its end being held in the brass sheath (21) of the first connector (1) or the brass ferrule (31a) or spring clip (31b) of the second connector (2).

The primary and secondary parts (1,2) are brought together by inserting the pin (20) of the primary part into the recess (30) of the secondary part. At this stage, the contact faces (13) are not aligned and are more likely to be perpendicular to each other. When the pin sits in the recess, the earth connection is made between the connectors and the fibre optics (23, 33) are adjacent each other. Whilst the pin can have a tight fit with the recess to contribute to holding the two connectors together, the main function of these components is to allow the primary and secondary parts to be quickly but accurately located with each other.

The primary and secondary parts are then twisted relative to each other about the pin and recess. As the connectors twist, the leading edges of the primary and secondary parts wipe over the contact face of the other part. This removes dirt and debris that may be on the contact faces and reduces the likelihood of debris becoming lodged between the contact faces when the two parts are connected together. The leading edges are defined as the front edges with respect to the direction of twisting/rotating.

The connectors are twisted until the arms (17) and lips (18) frictionally engage the recesses (19), locking the two parts together. At this stage, the half cores (14) are aligned, meaning that the ends (15) of the primary half core are adjacent the ends (15) of the secondary half core. Thus, a current passing through the winding (16) on one of the half cores causes a current to be induced in the winding (16) on the other half core.

Figure 4:
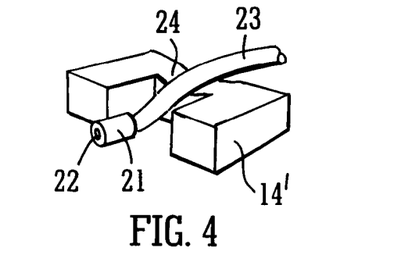
FIG. 4 is a perspective view of a half core for use in the present invention.
Figure 5:
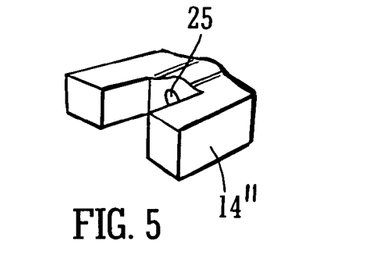
FIG. 5 is a perspective view of another half core for use in the present invention.

The half cores of the embodiments shown in FIGS. 1 to 3 are generally U-shaped and have square or rectangular profiles. In alternative embodiments, the half cores can have variable profiles along their length so as to better accommodate the earth wire and fibre optic, as shown in FIGS. 4 and 5. In FIG. 4, the half core (14') has a dipped or sunken portion (24) in which the earth wire and fibre optic (23) sit. In FIG. 5, the half core (14") is formed with a bore (25), through which the earth wire and fibre optic (23) pass. These arrangements reduce or eliminate deviation, or bending, of the fibre optic and earth wire.

Figure 6A:
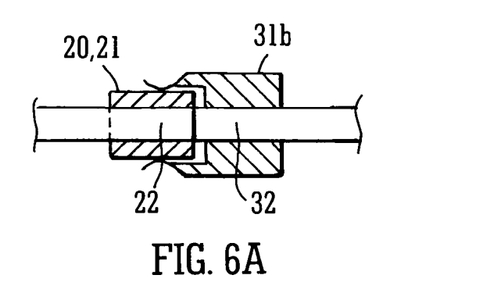
FIGS. 6a and 6b show schematic views of earth continuity contacts for use in the present invention.
Figure 6B:
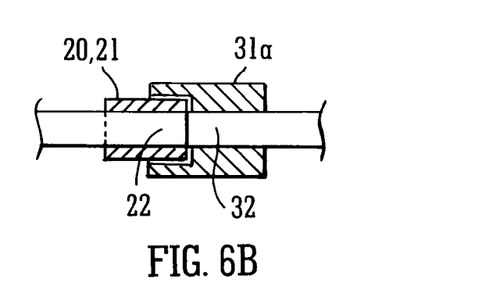

FIGS. 6a and 6b show the coupling between the end (22) of the fibre optic (23) in the pin (20) on the primary part (1) and the end (32) of the fibre optic (33) in the recess in the secondary part (2). It can be seen that the fibre optic in the primary part extends through the brass sheath (21) and the fibre optic in the secondary part is held in a ferrule (31b) or spring clip (31a).

Figure 7:
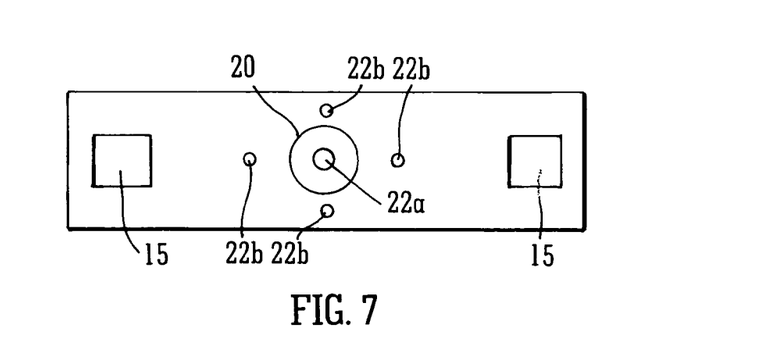
FIG. 7 shows an end view of a connector part in accordance with the present invention.

FIG. 7 shows the contact face of a primary part of a two-part connector. The primary part is generally the same as that shown in FIGS. 1 to 3 except that the contact face is rectangular and five data carriers (22a, 22b) are provided. One data carrier (22a) is positioned in the pin (20) and the other data carriers (22b) are located separately from the pin.

The secondary (not shown) also has a rectangular contact face and five data carriers. One of the data carriers is located in the recess and the others are located separately from the recess, in a manner corresponding to that shown in FIG. 7.

Figure 8A:
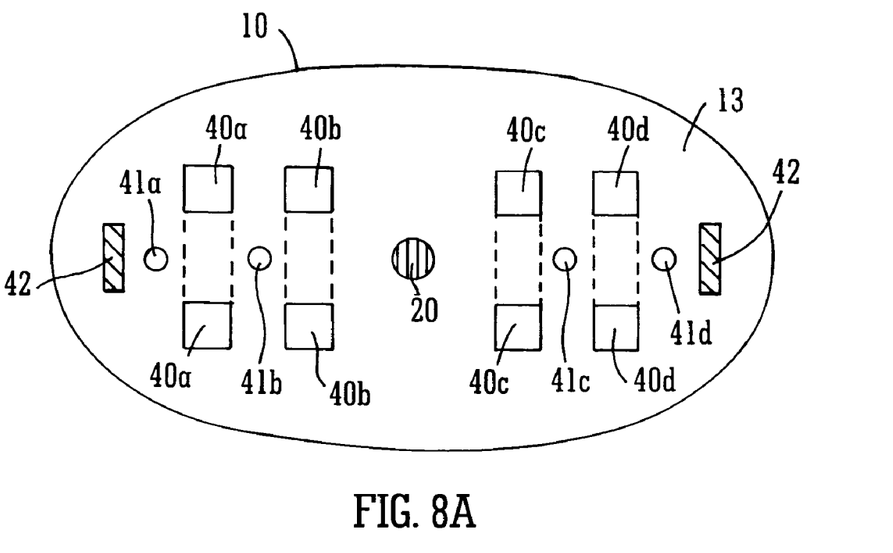
FIGS. 8a to 8d show end views of connector parts according to other embodiments of the invention.

FIGS. 8a to 8d show primary parts of two-part inductive connectors in accordance with other embodiments of the present invention. The primary part shown in FIG. 8a is similar to that shown in FIG. 2. However, the primary part of FIG. 8a has four primary half cores (40a, 40b, 40c, 40d) arranged so that they lie approximately along circumferential lines around the pin (20). In this way, when the primary part is notably coupled to a corresponding secondary part, the primary half cores (40a-d) move into alignment with corresponding secondary half cores in the secondary part.

In addition, the primary part of FIG. 8a includes four data carriers which can be in the form of four fibre optic cables (41a, 41b, 41c, 41d). The ends of the fibre optic cables (41a-d) are exposed at, and are flush with the contact face (13) of the primary part. As the primary part moves into alignment with a corresponding secondary part, the ends of the fibre optic cables (40a-d) move into alignment with corresponding ends of fibre optic cables exposed at the contact face of the secondary part. In this way, additional data connections can be made, allowing an increased rate of data transfer.

The pin (20) of the primary part shown in FIG. 8a does not include a data carrier, though it could optionally include a data carrier if desired.

Finally, the locking means in the primary part of this embodiment are in the form of magnets (42). The magnets are exposed at, and are flush with the contact face (13). However, they could alternatively be located just below the surface of the contact face so that they are not exposed to the environment. The corresponding secondary part is also provided with magnets. Thus, as the primary part and a corresponding secondary part are rotated relative to one another from the unlocked position to the locked position, the magnets become aligned and therefore move into engagement, holding the primary and secondary parts together by way of the magnetic force between the magnets.

Figure 8B:
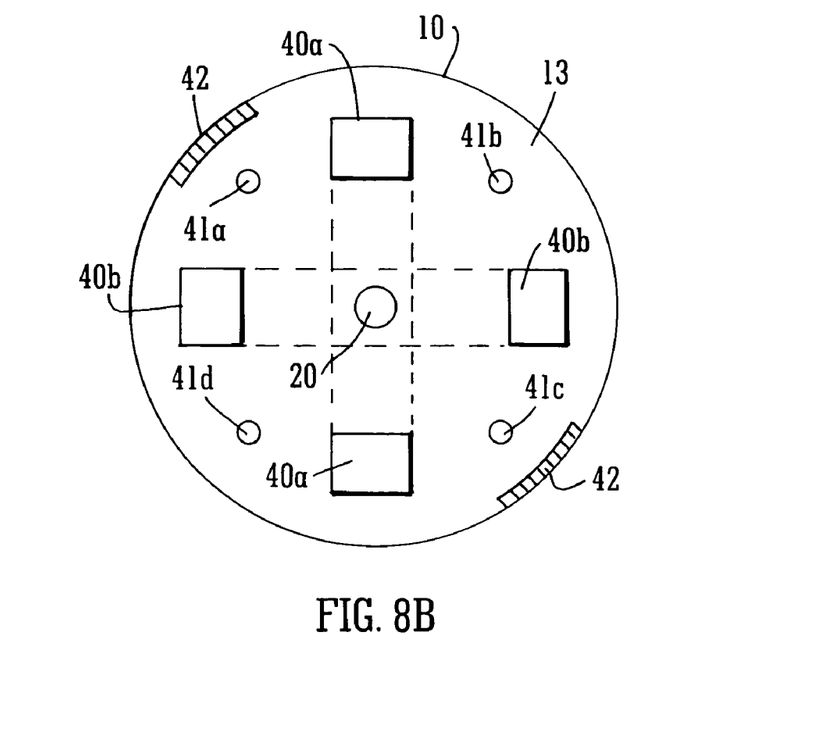

The primary part shown in FIG. 8b is similar to that shown in FIG. 8a, except that the housing (10) and contact face (13) are generally round, the fibre optic cables (41a-d) are arranged around the pin (20), and two primary half cores (40a, 40b) are provided, the half cores overlapping each other, as depicted by the broken lines. In addition, the magnets (42) are located on, and extend along, the side of the housing rather than along the contact face (13). In this embodiment, the corresponding secondary part to which the primary part can be coupled includes flanges carrying magnets. The flanges extend away from the housing of the secondary part such that they overlap the side of the housing of the primary part when the two parts are brought together. Rotation of the secondary part, and therefore the flanges, relative to the primary part, brings the magnets into alignment, and thus into the locked position.

In alternative embodiments, only one magnet may be provided on each of the primary and secondary parts, or one of the primary or secondary parts may be provided with a part which is attracted to the magnet on the other of the primary and secondary parts, such as an insert comprising steel or other suitable material.

The locking means shown in FIGS. 1 to 3 could alternatively be used, if preferred. Similarly, the locking means of FIGS. 1 to 3 could be replaced by the magnetic locking means shown in FIGS. 8a and 8b.

Figure 8C:
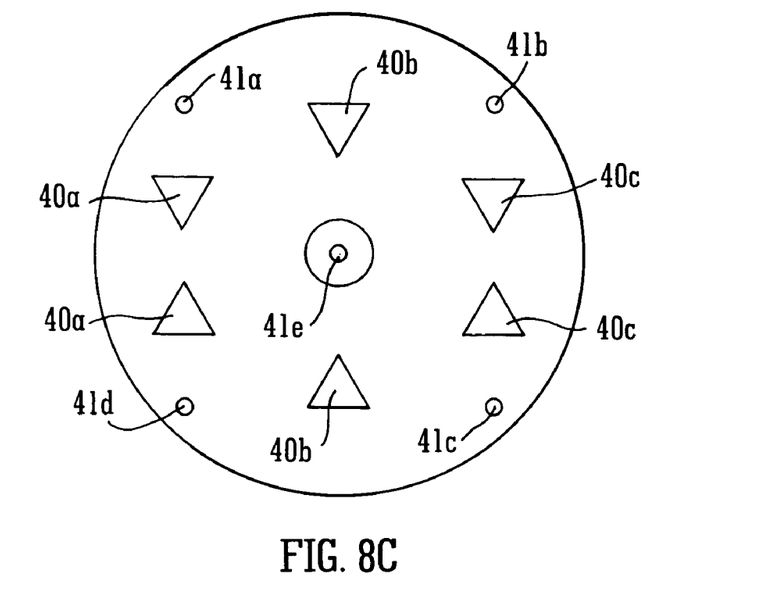
Figure 8D:
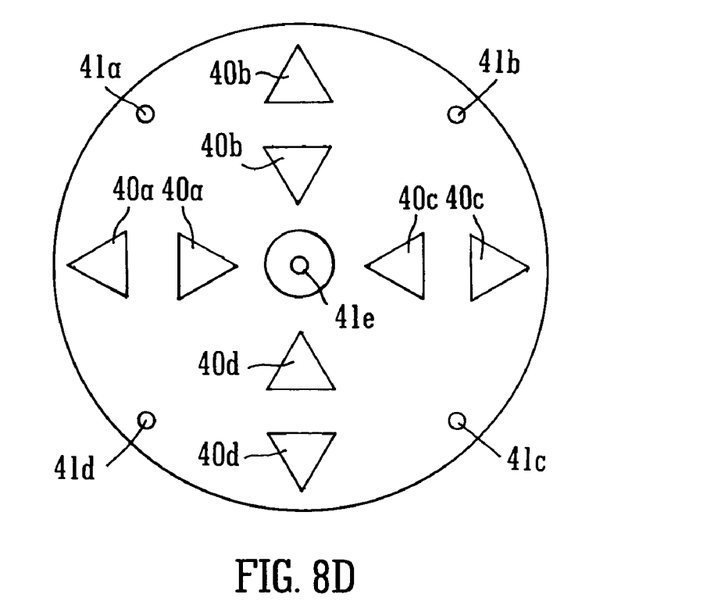

FIGS. 8c and 8d show further arrangements of multiple half cores and multiple data carriers (41a-41e). In these embodiments, the cross-section of the half cores is generally triangular. In FIG. 8c, three half cores (40a-40c) are provided, which are arranged substantially parallel to each other. In FIG. 8d, four half cores (40a-40d) are arranged generally radially around the pin.

FIGS. 8a to 8d illustrate examples of primary parts having a pin. It is to be understood that corresponding secondary parts, to which the primary parts are connectable, can be generally identical in construction except that they are formed with a recess to receive the pin. Alternatively, the primary parts shown in FIGS. 8a and 8d could instead be formed with a recess to receive a pin formed on corresponding secondary parts.

Figure 9A:
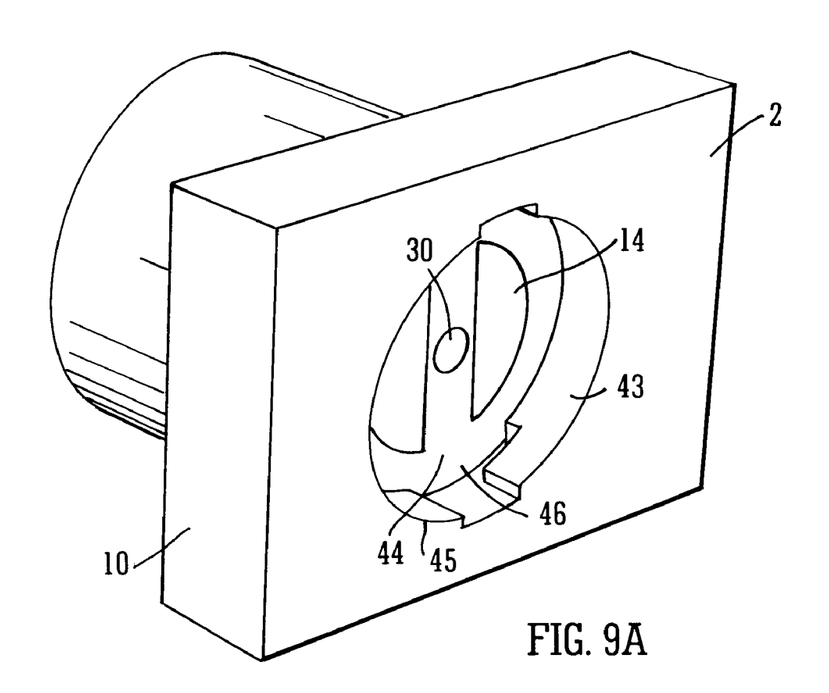
FIGS. 9a and 9b show perspective views of a primary part and a secondary part of a connector according to this invention.
Figure 9B:
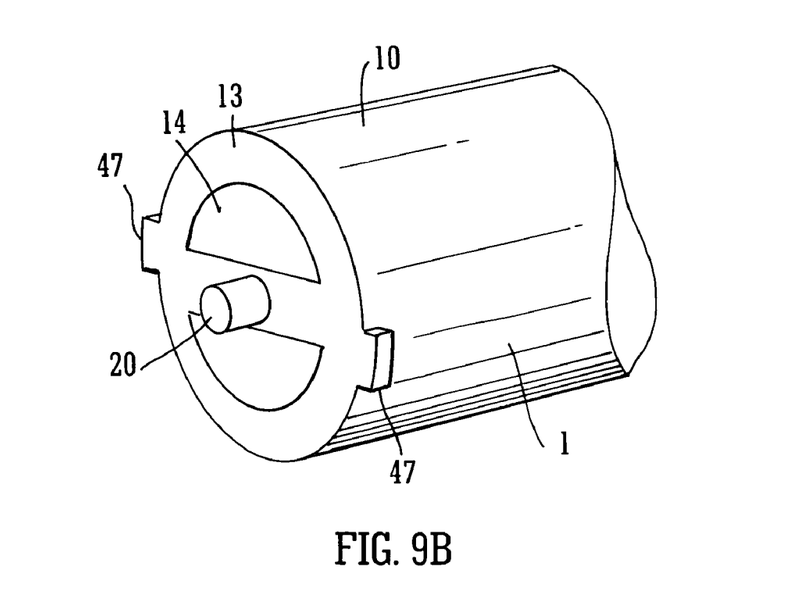

FIGS. 9a and 9b show another two-part inductive connector in accordance with the present invention. The connector is shown in a disconnected state.

The secondary part has a housing (10) with a bore (43) formed therein. The base (44) of the bore (43) forms a generally circular contact face (13) in which is formed the recess (30) for receiving the pin (20) of the primary part (1). Naturally, the bore may be shaped so that the contact face is a different shape, such as elliptical, the bore being shaped so as to allow rotation of the primary part within the bore. In the side wall (45) of the bore (43) is formed a catch in the form of an L-shaped channel (46).

The secondary half core (14) has a different shape to the half cores shown in earlier embodiments. Its cross section is generally half-moon shaped.

The secondary part (2) can form a panel-mounted socket, such as for a wall socket or a socket for an electrical device, such as a computer, laptop or mobile phone. Thus the secondary part can be integrated in an electrical device.

The shape of the housing (10) of the primary part generally matches the shape of the contact face of the secondary part and thus, in this example, is generally cylindrical (or at least the end of the housing is generally cylindrical). A pin (20) extends away from a generally circular contact face (13). Latches (47) extend radially outwardly from the housing.

In use, the primary part (1) is inserted into the bore (43) in the housing of the secondary part (2). At this stage, the latches (47) slide through the axially extending part of the L-shaped channel (46) and the pin (20) is inserted into the recess (30). When the primary and secondary parts have been brought together, rotation of the primary part relative to the secondary part causes the latches (47) to slide into the circumferentially extending part of the L-shaped channel (46). The latches frictionally engage the L-shaped channel, thus locking the two parts together.

Naturally, if desired, the primary part may be formed as shown in FIG. 9a and the secondary part may be formed as shown in FIG. 9b. Also, the pin may instead be formed on the secondary part and the recess formed in the primary part.

Figure 10:
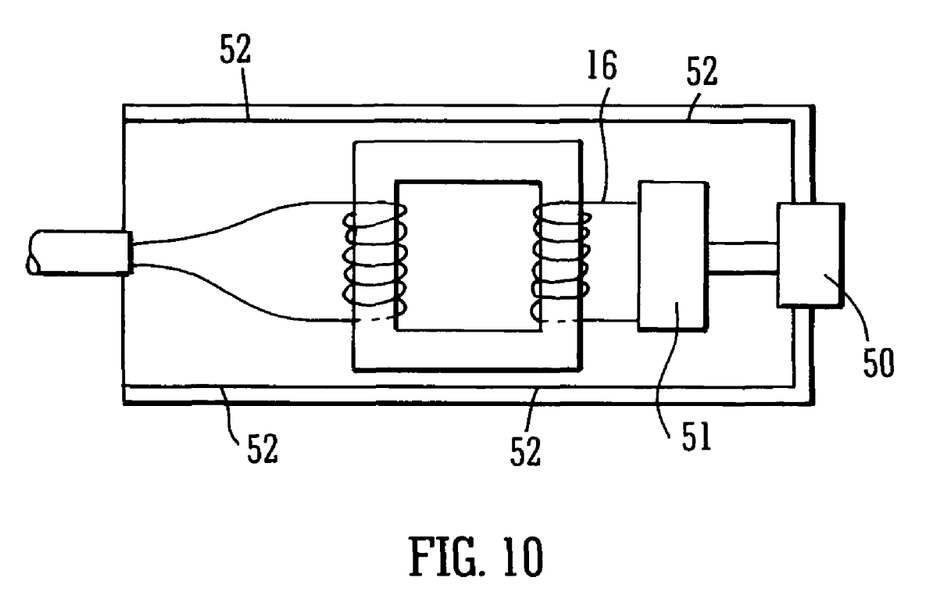
FIG. 10 is a schematic view of a two-part inductive connector according to a further embodiment.

FIG. 10 shows another embodiment of the two-part inductive connector of the invention. In this example, the secondary part is provided with a USB (50) connector to connect that part to an electrical device such as a camera, phone, computer or PDA. In this embodiment, the wire (16) wound around the half core is coupled to a DC module (51) containing a rectifier and regulator. The DC module (51) is in turn connected to the USB connector (50). The data carriers (52) are also coupled to the USB connector. In an alternative embodiment, the secondary part does not include the DC module.

The USB may alternatively or additionally be provided on the primary part.

Specific embodiments of the invention have been described. However, variations will be apparent to the skilled person, such as different shaped half cores or different shaped housings and contact faces.

The invention claimed is:

1. A two-part inductive connector comprising:
a primary part having a primary half core, a first locking means, and a pin extending from between ends of the primary half core; and
a secondary part having a secondary half core, a second locking means, and a recess configured for receiving the pin of the primary part;
wherein the first locking means of the primary part are engageable with the second locking means on the secondary part, the connector having an unlocked position in which the primary and secondary half cores are not aligned and in which the first and second locking means are not engaged, and a locked position in which the primary and secondary half cores are aligned and the first and second locking means engaged, the connector moving between the unlocked and locked positions by relative rotation of the primary and secondary parts about the pin wherein the locking means comprises at least one axially extending arm provided on one or both of the primary and secondary parts, the arm carrying a lip protruding perpendicularly therefrom, and at least one recess formed on the other or both of the primary and secondary parts, the lip and the recess being sized and shaped to frictionally engage upon relative twisting of the primary and secondary parts.

2. A connector according to claim 1, wherein the primary and secondary parts each further include a data carrier for transmitting data between the primary part and the secondary part.

3. A connector according to claim 2, wherein the data carriers are incorporated in the pin and recess such that the data carriers are brought into alignment when the pin is located in the recess.

4. A connector according to claim 2, wherein the data carriers are spaced apart from the pin and recess such that the data carries are brought into alignment when the locking means are engaged.

5. A connector according to claim 3 or claim 4, wherein each of the primary and secondary parts further includes one or more additional data carriers which are spaced apart from the pin and recess such that they are brought into alignment when the locking means are engaged.

6. A connector according to claim 5, wherein the data carriers are fibre optic cables.

7. A connector according to claim 6, wherein the pin and recess each include an earth connection for providing a continuous earth line through the connection between the primary and secondary parts.

8. A connector according to claim 7, in which each of the primary and secondary parts further includes one or more additional primary or secondary half cores respectively, the respective primary and secondary half cores being brought into alignment in the locked position.

9. A connector according to claim 8, wherein the primary part includes a generally planar contact face for contacting, in use, a contact face of the secondary part.

10. A connector according to claim 9, wherein the primary and secondary parts are configured so that the contact faces are not aligned with each other in the unlocked position and are aligned with each other in the locked position.

11. A connector according to claim 10, wherein the contact faces are elongate.

12. A connector according to claim 11, wherein the pin and recess are generally centrally located on the contact faces respectively.

13. A connector according to claim 12, in which an electrical wire is wound around each half core and in which at least one of the primary or secondary parts is coupled to a cable having electrical lines connected to the electrical wires wound around the half core of said primary or secondary parts for carrying a current to or from the electrical wires.

14. A connector according to claim 13, wherein the cable is adapted to connect to at least one of a power supply and to an electrical appliance.

15. A connector according to claim 14, wherein the data carrier is incorporated in the cable.

16. A connector according to claim 15, wherein the earth line is incorporated in the cable.

17. A connector according to claim 16, in which an electrical wire is wound around each half core, the electrical wire of at least one of the primary or secondary parts being adapted to be connected directly in an electrical device.

18. A connector according to claim 17, further comprising a switch on at least one of the primary and secondary parts to vary the relative number of windings of the electrical wire which are operative on the half cores respectively.

19. A connector according to claim 18, wherein the half cores are shaped to allow at least one of an earth connection, and data carrier to pass through the connector.

20. A connector according claim 19 in which the first and second locking means are frictionally engaged in the locked position.

21. A connector according to claim 20, wherein the first and second locking means resiliently clip or snap into engagement in the locked position.

22. A connector according to claim 21, wherein the locking means include magnets on the primary and secondary parts.

23. A connector according to claim 22, wherein the primary and secondary half cores are at least partially mounted in first and second housings respectively.

24. A connector according to claim 23, wherein at least one of the primary and secondary parts is provided with a USB connector.

25. An inductive connector for coupling to a second inductive connector, comprising an inductive half core, locking means for engaging with locking means on the second inductive connector and locating means selected from a pin or a recess to engage corresponding locating means on the second inductive connector and to allow rotation of the inductive connector relative to the second inductive connector about the locating means to bring the locking means into engagement.

26. An inductive connector system comprising:
a first part comprising:
   a housing having a contact face, an arm extending in an axial direction past the contact face, and a recess defined in the housing, the arm having a lip projecting perpendicularly thereto;
   a first half core located in the housing with ends of the first half core being exposed through the contact face of the housing;
   a pin extending centrally away from the contact face of the housing between the exposed ends of the first half core, the arm being parallel with the pin;
a second part comprising:
   a housing having a contact face, an arm extending in an axial direction past the contact face, and a recess defined in the housing, the arm having a lip projecting perpendicularly thereto;
   a first half core located in the housing with ends of the first half core being exposed through the contact face of the housing; and
   a pin recess centrally defined therein from the contact face of the housing of the second part between the exposed ends of the first half core, the pin recess is configured to receive the pin of the first part, the arm of the second part being parallel with the pin recess;

wherein the inductive connector system having an unlocked position in which the ends of the first and second half cores are not aligned and in which the arms and lips of the first and second parts are not engaged with the recesses of the first and second parts respectively, and a locked position in which the ends of the first and second half cores are aligned and the arms and lips of the first and second parts are engaged with the recesses of the first and second parts respectively, the inductive connector system moving between the unlocked and locked positions by relative rotation of the first and second parts about the pin and pin recess;

wherein the arms and recesses of the first and second parts form a continuous surface with no protrusions or cavities when the first and second parts are coupled together in the locked position.

27. The inductive connector system according to claim 26, wherein the pin is a brass sheath around an end of a fibre optic cable, and wherein the pin recess includes at least one of a brass ferrule and spring clip located therein to receive the brass sheath, the at least one of a brass ferrule and spring clip further including an end of another fibre optic cable located therein.

28. The inductive connector system according to claim 27, wherein an electrical wire is wound around each of the first and second half cores, the electrical wire of at least one of the first and second parts being connected directly in an electrical device.

29. The inductive connector system according to claim 28, wherein the first and second parts each further comprising a cable having a live wire and a neutral wire in communication with the ends of the electrical wires wound around the first and second half cores respectively, the cable further including an earth wire connected to the brass sheath of the first part and the at least one of the brass ferrule and spring clip of the second part respectively.

30. The inductive connector system according to claim 29, wherein the cable of the first and second parts comprises the fibre optic cables respectively, each of the fibre optic cables extends through the housing of the first and second parts respectively, and around the first and second half cores respectively.

* * * * *